United States Patent [19]

Meister, III et al.

[11] Patent Number: 4,632,642

[45] Date of Patent: Dec. 30, 1986

[54] MOTOR-FAN MOUNTING SYSTEM FOR CANISTER VACUUM CLEANER

[75] Inventors: Earl E. Meister, III, Danville, Ky.; Bruce E. Stewart, Maplewood, Minn.

[73] Assignee: Whirlpool Corporation, Benton Harbor, Mich.

[21] Appl. No.: 747,891

[22] Filed: Jun. 24, 1985

[51] Int. Cl.⁴ .......................... F04C 29/00; H02K 5/24

[52] U.S. Cl. ................................ 417/363; 417/423 A; 248/632; 310/51

[58] Field of Search .................... 417/363, 423 A, 424; 248/632, 634, 638; 310/51; 15/326, 412

[56] References Cited

U.S. PATENT DOCUMENTS

| | | | |
|---|---|---|---|
| 1,953,473 | 4/1934 | Fedders | 417/363 X |
| 2,036,058 | 3/1936 | Lang | 230/117 |
| 2,184,446 | 12/1939 | Snyder | 417/423 A |
| 2,221,572 | 11/1940 | Brock et al. | 183/25 |
| 2,652,902 | 9/1953 | Sheahan | 183/37 |
| 2,656,897 | 10/1953 | Yonkers, Jr. | 183/37 |
| 2,691,424 | 10/1954 | Sebok | 183/44 |
| 2,843,314 | 7/1958 | Hansen | 230/232 |
| 2,886,127 | 5/1959 | Brock | 417/363 |
| 3,031,129 | 4/1962 | Gaudry | 230/117 |
| 3,101,889 | 8/1963 | Tatge | 230/117 |
| 3,242,871 | 3/1966 | Mercer | 417/363 |
| 3,257,784 | 6/1966 | Grellsson | 55/472 |
| 3,320,725 | 5/1967 | Foster | 55/283 |
| 3,339,867 | 9/1967 | Bayless | 248/2 |
| 3,459,977 | 8/1969 | Janssen | 310/51 |
| 4,442,367 | 4/1984 | Suzuki | 248/632 X |

FOREIGN PATENT DOCUMENTS

| | | | |
|---|---|---|---|
| 534600 | 12/1956 | Canada | 417/363 |
| 50137176 | 5/1977 | Japan | 417/363 |

*Primary Examiner*—Carlton R. Croyle
*Assistant Examiner*—Theodore Olds
*Attorney, Agent, or Firm*—Wood, Dalton, Phillips Mason & Rowe

[57] ABSTRACT

A vacuum cleaner having improved structure for mounting the motor-fan assembly to a mounting plate and resilient motor mount ring. Bosses are provided on the housing whereby screws utilized for securing the mounting structure to the bosses are readily accessible. Further, the bosses provide air circulation under the motor-fan assembly for improved air-cooled operation thereof.

20 Claims, 9 Drawing Figures

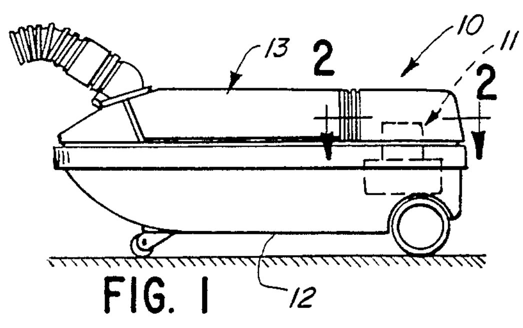
FIG. 1
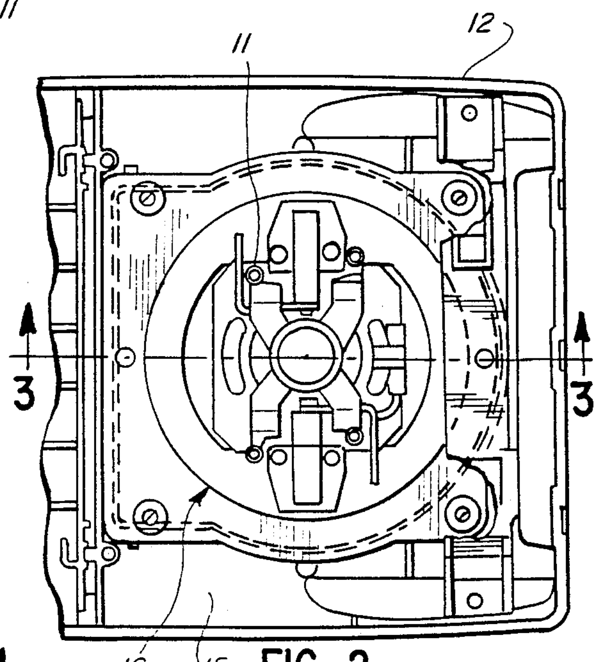
FIG. 2
FIG. 4
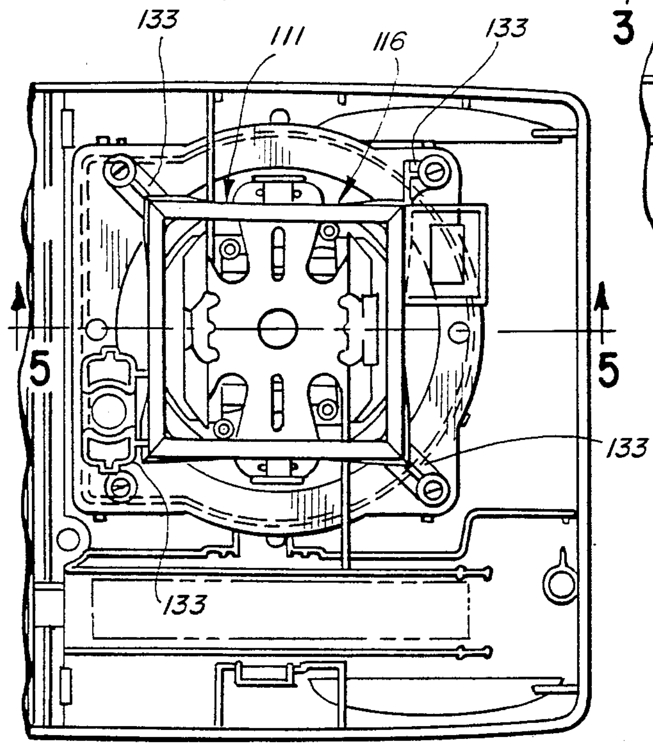
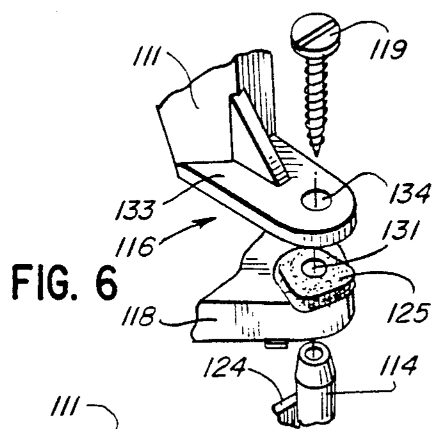
FIG. 6
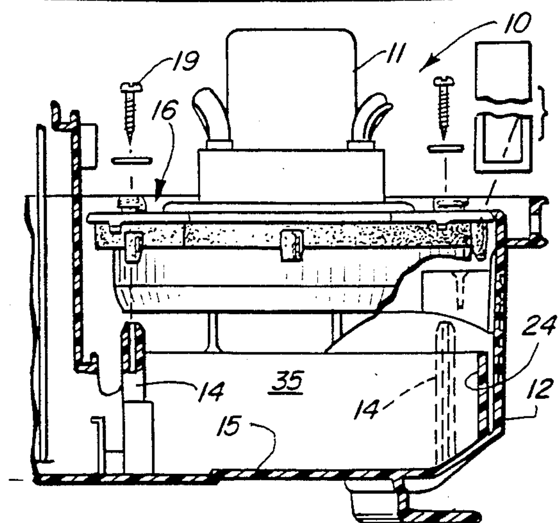
FIG. 3
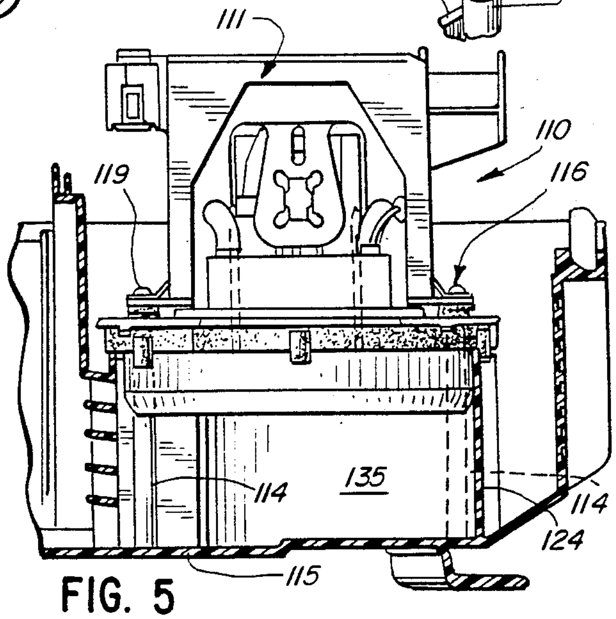
FIG. 5

MOTOR-FAN MOUNTING SYSTEM FOR CANISTER VACUUM CLEANER

TECHNICAL FIELD

This invention relates to vacuum cleaners, and in particular to means for mounting the motor-fan assembly of such a vacuum cleaner to the vacuum cleaner housing.

DESCRIPTION OF THE BACKGROUND ART

It is desirable in vacuum cleaner appliances, to mount the motor-fan assembly resiliently to the housing of the vacuum cleaner. Thus, illustratively, where the vacuum cleaner comprises a canister-type vacuum cleaner, the motor-fan assembly is mounted resiliently to the base portion of the canister housing.

It is desirable in such mountings to facilitate the assembly by providing ready access to the fastening means, such as screws. Such access is desirable for effectively maximizing economy in manufacture and for facilitating maintenance of the appliance.

It is further desirable to maximize the useful life of the vacuum cleaner structure by providing for optimized cooling of the motor during use of the vacuum cleaner. It is desirable to provide a flow path for air to be drawn into the motor-fan assembly so as to effect such desirable improved operation.

Additionally, it is desirable to maximize the useful life of the vacuum cleaner structure by providing for improved reliability of the mounting system.

DISCLOSURE OF THE INVENTION

The present invention comprehends an improved means for mounting the motor-fan assembly of a vacuum cleaner in the housing thereof.

The invention comprehends the provision of improved means for resiliently mounting the motor-fan assembly to supports carried by the housing so as to provide facilitated access to the fastening means associated therewith.

The invention further comprehends the provision of such a structure wherein the mounting is arranged to provide for facilitated air flow to the motor-fan assembly for optimum cooling of the motor during use of the vacuum cleaner.

In the illustrated embodiment, four bosses or posts, substantially equally spaced about an adjoining, substantially cylindrical wall formed on the base of the canister housing so as to provide an air accessed cylindrical space providing for improved air flow to the motor-fan assembly in use.

The bosses are arranged so as to locate the fastening means connecting the mounting means for the motor-fan assembly to the bosses at an elevated position for facilitated access thereto.

More specifically, in the illustrated embodiment, a vacuum cleaner having a base and motor-fan assembly is provided with improved support means on the base defining upstanding support posts having distal ends, a resilient mounting ring, a rigid mounting ring, a rigid mounting plate, mounting means mounting the motor-fan assembly to at least one of the mounting plate and mounting ring, cooperating means on the rigid mounting plate and resilient mounting ring for mounting the mounting plate to the mounting ring, including openings in the mounting plate and portions of the mounting ring aligned with the openings, and securing means securing the mounting ring to the distal ends of the posts to mount the motor-fan assembly thereto to be spaced substantially above the base to provide air flow upwardly to the motor-fan assembly.

In one embodiment of the invention, the motor-fan assembly means includes switch means, a switch mounting plate carrying the switch means, support means on the base defining upstanding support posts having distal upper ends, a resilient mounting ring, a rigid mounting plate, mounting means mounting the motor-fan assembly to at least one of the mounting plate and mounting ring, cooperating means on the rigid mounting plate and resilient mounting ring for mounting the mounting plate to the mounting ring including openings in the mounting plate and portions of the mounting ring aligned with the openings, and securing means securing the switch mounting plate and mounting ring to the distal ends of the posts and across the rigid mounting plate to mount the motor-fan assembly to the posts.

In the illustrated embodiment, the motor-fan assembly is mounted by means of a vibration-absorbing mount including a metal mounting plate having a plurality of through openings, a plurality of laterally spaced rigid motor mount supports on the housing, a vibration-absorbing mount element formed of an elastomeric material, the mount element having a plurality of upstanding integral bosses projecting one each through the openings, each boss having an outturned distal flange overlying a portion of the mounting plate adjacent the opening through which the boss extends, each boss being resiliently deflectible to permit the passage of the distal end of the boss including the flange through the opening in assembling the mounting plate to the vibration-absorbing mount element, securing means extending through each boss into secured relationship with the rigid supports, the securing means preventing displacement of each flange from the overlying relationship with the mounting plate portion as a result of the extension of the securing means through the boss, whereby a motor mounted to the mounting plate is retained in resiliently mounted vibration-absorbent association with the rigid motor mount supports, and means for mounting the unit to the supports comprising at least one of (a) means mounting the unit directly to the mounting plate, and (b) means on the unit cooperating with the securing means for mounting the unit directly to the mount element.

Thus, the improved means for mounting the motor-fan assembly of the vacuum cleaner of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a side elevation of a canister-type vacuum cleaner having a base and a motor-fan assembly embodying the invention;

FIG. 2 is a fragmentary enlarged horizontal section taken substantially along the line 2—2 of FIG. 1;

FIG. 3 is a horizontal section taken substantially along the line 3—3 of FIG. 2;

FIG. 4 is a fragmentary horizontal section similar to that of FIG. 2, but illustrating a modified form of vacuum cleaner structure embodying the invention;

FIG. 5 is a fragmentary vertical section taken substantially along the line 5—5 of FIG. 4;

FIG. 6 is a fragmentary enlarged perspective view of the fastening means of the invention;

BEST MODE FOR CARRYING OUT THE INVENTION

Figure 7:
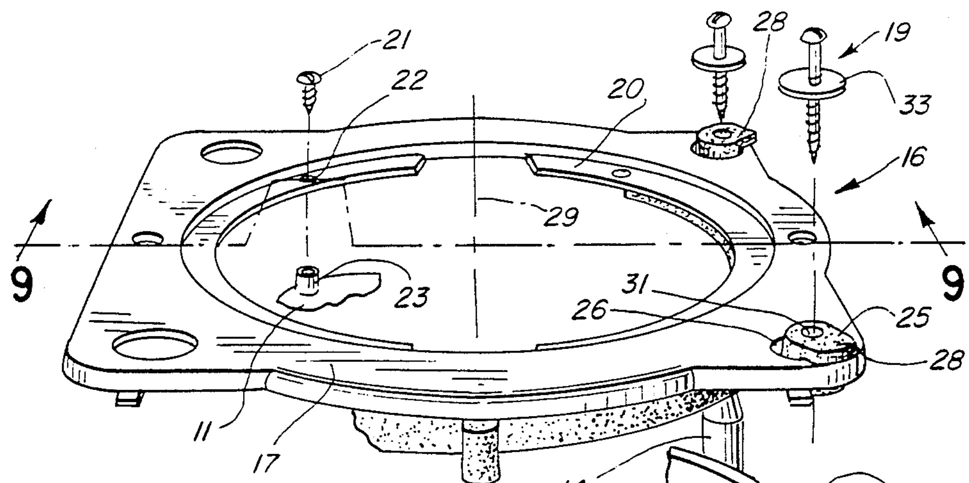
FIG. 7 is a fragmentary exploded perspective view of the motor-fan assembly mounting means.

In the exemplary embodiment of the invention as shown in the drawing, a vacuum cleaner apparatus generally designated 10 is provided with a motor-fan assembly generally designated 11 mounted to a base portion 12 of the housing generally designated 13 of the vacuum cleaner, illustratively shown as a canister-type vacuum cleaner. The present invention is concerned with the resilient mounting of the motor-fan assembly to the base.

More specifically, as shown in FIGS. 2 and 3, the invention comprehends the provision of a plurality of upstanding posts 14 on the bottom wall 15 of the base 12. The motor-fan assembly 11 is removably mounted to the upper ends of posts 14 by a mounting structure generally designated 16, which is comprised of a metal mounting plate 17 and a resilient mounting ring 18. The mounting structure 16 is removably secured to the upper ends of the post 14 by suitable fastening means, such as screws 19, which extend through bosses 25 of the resilient mounting ring 18 extending through openings 26 in the mounting plate, as illustrated in FIG. 7.

Motor-fan assembly 11 is removably secured to a radially inwardly directed segmentally annular flange 20 of the mounting plate 17 by means of screws 21 extending through suitable openings 22 in the flange 20 and into aligned support bosses 23 on the motor-fan assembly 11. Resultingly, the motor-fan assembly is rigidly secured to the metal mounting plate 17 which, in turn, is resiliently carried on the resilient mounting ring 18, the resilient mounting ring, in turn, being carried by and secured to the support posts 14 and interconnecting wall or web 24 extending between the mounting posts in an adjoining relationship to the posts.

As indicated above, the mounting bosses 25 extend upwardly through the openings 26 in the mounting plate. Each mounting boss includes a cylindrical portion 27 formed integrally with the mounting ring 18, and a cantilevered flange portion 28 which extends outwardly relative to the central axis 29 of the mounting structure 16. Thus, as seen in FIG. 7, the flange portions 28 of the mounting bosses overlie outer extension surfaces 30 of the mounting plate 16. The mounting ring is formed of a suitable resilient material, such as rubber, which, in the illustrated embodiment, comprises neoprene rubber. As will be obvious to those skilled in the art, other suitable mounting materials may be utilized in the broad scope of the invention. The resiliency of the mounting ring material permits the bosses to be deflected inwardly in passing the bosses and flange portions 28 thereof upwardly through the mounting plate openings 26 to effect the assembled relationship of the mounting ring and mounting plate, as illustrated in FIG. 7. As thusly associated, the resiliency of the mounting ring material causes the flanges to be biased outwardly into the desired overlying relationship to the mounting plate portions 30.

Figure 8:
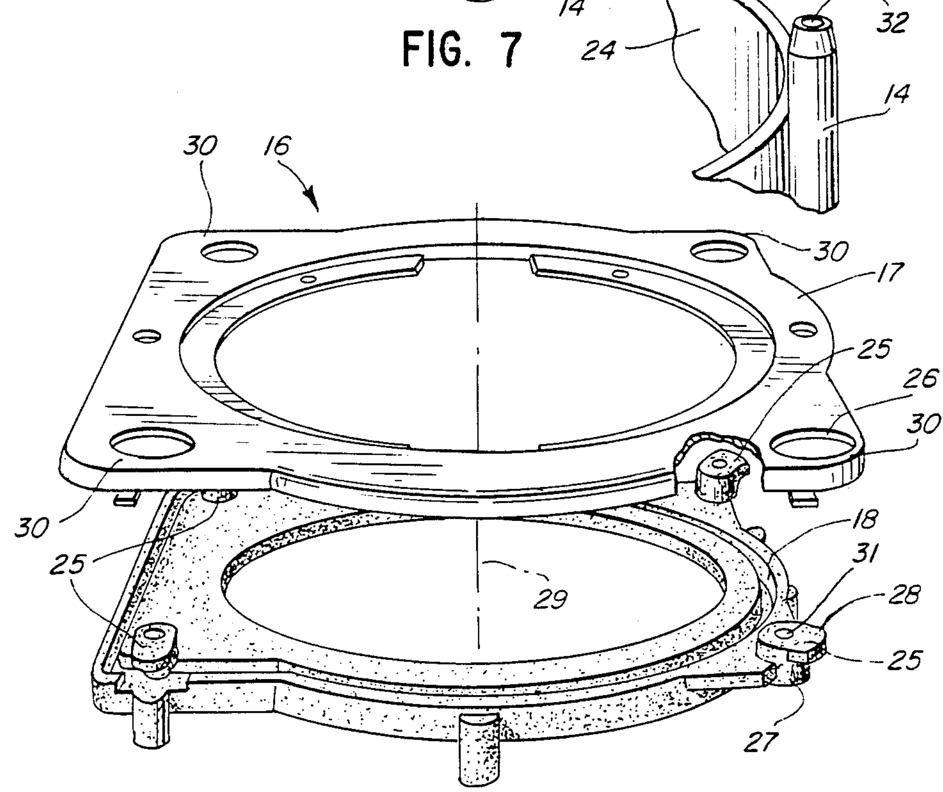
FIG. 8 is an exploded perspective view illustrating the arrangement of the motor mount ring and motor mount plate.
Figure 9:
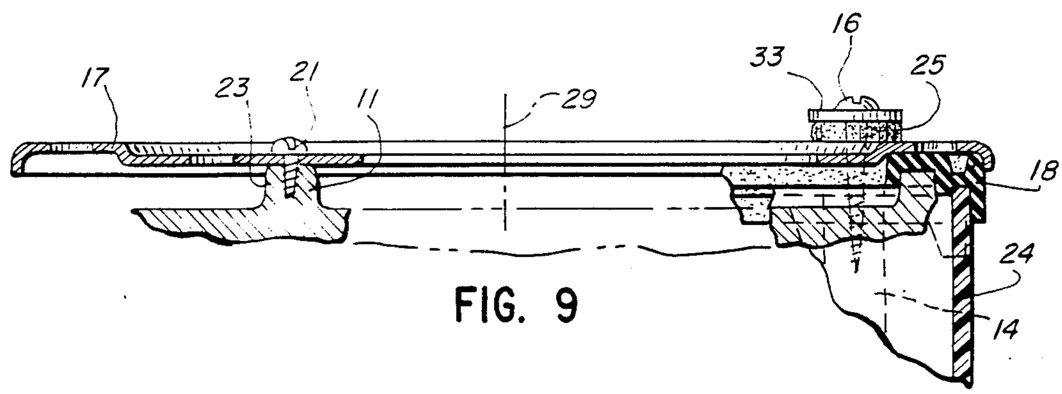
FIG. 9 is a fragmentary vertical section illustrating in greater detail the fastened arrangement of the motor mounting means to the upstanding bosses on the canister housing base.

The securing screws 19 are passed through openings 31 in the mounting bosses and threaded into complementary bores 32 in the posts 14. It is desirable that the securing or clamping force area be distributed over a substantial area of the upper surface of the mounting bosses 25. In the illustrated embodiment, the screws 19 are provided with washers 33 for effecting such distribution of the clamping force. Alternatively, screws 19 may comprise pan head screws or the like, having a relatively large diameter head. As best seen in FIGS. 7, 8 and 9, the clamping of the mounting plate by the mounting ring is effected by portions of the mounting ring engaging the mounting plate at disaligned positions for effectively clamping the mounting plate therebetween. More specifically, as seen in FIG. 9, the radially outermost portion of the mounting boss 25 overlying the mounting plate is disaligned with the outermost portion of the resilient mounting ring underlying the mounting plate, thereby providing an improved resilient mounting of the motor-fan assembly to the support posts 14.

Screws 19 are urged forcibly against the upper surface of the washers 33 so as to compress the bosses axially and expand the bosses radially relative to the openings 31, thereby causing the cylindrical portion 27 of the boss to effectively maintain the flange portion 28 of each boss in overlying relationship to the plate extension portion 30, thereby effectively resiliently securing the mounting structure 16 to the posts 14.

Referring now to the embodiment of FIGS. 4, 5 and 6, a modified form of mounting structure generally designated 116 is shown to comprise a mounting structure generally similar to mounting structure 16, but wherein the motor-fan assembly 111 is provided with a plurality of outwardly directed mounting arms 133, each provided with a through opening 134 through which the mounting screw 119 is extended to pass downwardly through the opening 131 in the mounting boss 125. Thus, the mounting arm eliminates the need for washer 33 in providing a distribution of the clamping area over the upper surface of the mounting boss 125. As illustrated in FIG. 4, four such mounting arms 133 may be provided corresponding to the four mounting posts 114.

As illustrated in FIG. 5, the support posts 114 are similar to support posts 14 in extending substantially upwardly from the bottom wall 115 of the vacuum cleaner housing. Thus, in the vacuum cleaner apparatus generally designated 10, as shown in FIG. 3, an air chamber generally designated 35 is provided subjacent the motor-fan assembly 11 for providing optimum delivery of cooling air to the motor-fan assembly when the vacuum cleaner is in use. Similarly, in the vacuum cleaner apparatus generally designated 110 illustrated in FIG. 4, 5 and 6, the mounting posts 114 and the adjoining interconnecting wall or web 124 space the motor-fan assembly 111 substantially above the bottom wall 115 of the housing to define a similar air chamber 135 below the motor-fan assembly 111 to provide for optimum delivery of cooling air thereto in the operation of the vacuum cleaner apparatus 110.

The provision of the relatively tall mounting posts 14 and 114 permits facilitated access to the securing screws 19 and 119 in the vacuum cleaner apparatuses 10 and 110, thereby facilitating manufacture and facilitating maintenance when necessary. Both manipulation of the screws and viewing access is enhanced thereby.

Thus, in broad aspect, the invention comprehends an improved vacuum cleaner structure wherein the motor fan assembly is removably mounted to a base portion of the housing of the vacuum cleaner by a novel resilient supporting means. The housing is provided with upstanding support posts to which bosses on the mounting ring are secured by suitable fasteners. The fasteners serve to retain the bosses in association with a rigid mounting plate of the mounting structure, which may carry the motor-fan assembly. Alternatively, the motor-fan assembly may be provided with arms clamped against the resilient mounting bosses by the fasteners.

Thus, the improved structure of the present vacuum cleaner apparatus provides an improved mounting of the motor-fan assembly to the vacuum cleaner housing which permits facilitated manufacture and maintenance and which provides long, troublefree life as a result of the improved cooling air delivery to the motor-fan assembly afforded thereby.

The foregoing disclosures of specific embodiments are illustrative of the broad inventive concepts comprehended by the invention.

We claim:

1. In a vacuum cleaner having a base and a motor-fan assembly, the improvement comprising:

support means on the base defining upstanding support posts having upper distal ends;

a resilient mounting ring;

a rigid mounting plate;

mounting means removably securing the motor-fan assembly to the mounting plate;

cooperating means on said rigid mounting plate and resilient mounting ring for mounting said mounting plate to the mounting ring including openings in said mounting plate and portions of said mounting ring aligned with and extending through said openings, said mounting ring engaging said mounting plate below and above said plate at disaligned positions at opposite edge portions of the associated opening for effectively clamping the mounting plate therebetween; and securing means securing the mounting ring to said upper distal ends of the posts to mount the motor-fan assembly resiliently to said posts to be spaced substantially above said base to provide air flow upwardly to said motor-fan assembly.

2. The vacuum cleaner of claim 1 wherein said securing means comprises pan head screws.

3. The vacuum cleaner of claim 1 wherein said securing means comprises cooperating threaded elements and washers.

4. The vacuum cleaner of claim 1 further including web means interconnecting said support posts.

5. The vacuum cleaner of claim 1 wherein said support posts are formed of synthetic resin.

6. The vacuum cleaner of claim 1 wherein said mounting plate is formed of metal.

7. The vacuum cleaner of claim 1 wherein said mounting ring end portions comprise resiliently deflectible bosses projecting upwardly through said openings.

8. In a vacuum cleaner having a base and a motor-fan assembly, the improvement comprising:

switch means;

a switch mounting plate carrying said switch means;

support means on the base defining upstanding support posts having distal upper ends;

a resilient mounting ring;

a rigid mounting plate;

mounting means removably securing the motor-fan assembly to the mounting plate;

cooperating means on said rigid mounting plate and resilient mounting ring for mounting said mounting plate to the mounting ring including openings in said mounting plate and portions of said mounting ring aligned with and extending through said openings, said mounting means engaging said mounting plate below and above said plate at disaligned positions at opposite edge portions of the associated opening for effectively clamping the mounting plate therebetween; and securing means securing the switch mounting plate and mounting ring to said distal upper ends of the posts and across said rigid mounting plate to mount the motor-fan assembly resiliently to said posts.

9. The vacuum cleaner of claim 8 wherein said securing means comprises pan head screws.

10. The vacuum cleaner of claim 8 wherein said securing means comprises cooperating threaded elements and washers 11. The vacuum cleaner of claim 8 wherein said support means comprise posts.

12. The vacuum cleaner of claim 8 wherein said support means comprise posts formed of synthetic resin.

13. The vacuum cleaner of claim 8 wherein said mounting plate is formed of metal.

14. The vacuum cleaner of claim 8 wherein said mounting plate end portions comprise bosses projecting upwardly through said openings.

15. In a vacuum cleaner having an electrically driven motor-fan unit and a housing, an improved vibration absorbing mount for said unit comprising:

a metal mounting plate having a plurality of through openings;

a plurality of laterally spaced rigid motor mount supports on said housing;

a vibration-absorbing mount element formed of an elastomeric material, said mount element having a plurality of upstanding integral bosses projecting one each through said openings, each boss having an outturned distal flange overlying a portion of the mounting plate adjacent the opening through which the boss extends, each said boss being resiliently deflectible to permit the passage of the distal end of the boss including the flange through the opening in assembling the mounting plate on the vibration-absorbing mount element, said distal flanges being disaligned with the mount element underlying the mounting plate;

securing means extending through each said boss into secured relationship with said rigid supports, said securing means preventing displacement of each of said flanges from the overlying relationship with the mounting plate portion as a result of the extension of the securing means through the boss, whereby a motor mounted to said mounting plate is retained in resiliently mounted vibration-absorbent association with said rigid motor mount supports; and means removably mounting said unit directly to said mounting plate.

16. In a vacuum cleaner as claimed in claim 15 wherein said bosses are provided with through bores, said securing means comprising screws extending through said bores.

17. In a vacuum cleaner as claimed in claim 15 wherein said bosses are provided with through bores, said securing means comprising screws extending through said bores, and means defining a force-distributing surface associated with each screw for preventing displacement of the screw inwardly through the bore.

18. In a vacuum cleaner as claimed in claim 15 wherein each said boss defines a longitudinal axis and said distal flange comprises a tongue extending radially relative to said axis.

19. In a vacuum cleaner as claimed in claim 15 wherein each said boss defines a longitudinal axis and said distal flange comprises a tongue extending radially relative to said axis and having a width substantially equal to the transverse extent of the boss perpendicular to said axis.

20. In a vacuum cleaner as claimed in claim 15 wherein said means for mounting said motor comprises an arm on the motor means clamped to the mounting boss by said securing means.

* * * * *